(12) United States Patent
Nomura

(10) Patent No.: US 7,658,575 B2
(45) Date of Patent: Feb. 9, 2010

(54) MACHINE REAMER

(75) Inventor: Takuji Nomura, Amagasaki (JP)

(73) Assignee: Unitac, Inc. (JP)

( * ) Notice: Subject to any disclaimer, the term of this patent is extended or adjusted under 35 U.S.C. 154(b) by 0 days.

(21) Appl. No.: 11/755,854

(22) Filed: May 31, 2007

(65) Prior Publication Data
US 2007/0237593 A1 Oct. 11, 2007

Related U.S. Application Data

(63) Continuation of application No. PCT/JP2006/313310, filed on Jul. 4, 2006.

(30) Foreign Application Priority Data
Jul. 25, 2005 (JP) .............................. 2005-214243

(51) Int. Cl.
*B23D 77/02* (2006.01)
(52) U.S. Cl. .......................... 408/144; 408/145
(58) Field of Classification Search ................. 408/144, 408/145, 27, 56, 227, 713, 230; *B23D 77/02; B23B 51/00, B23B 51/02*
See application file for complete search history.

(56) References Cited

U.S. PATENT DOCUMENTS

| | | | | |
|---|---|---|---|---|
| 2,188,584 A | * | 1/1940 | Tyne | ........................... 408/223 |
| 5,110,349 A | * | 5/1992 | Westergren et al. | ........... 75/233 |
| 5,561,321 A | * | 10/1996 | Hirano et al. | ................ 257/700 |
| 5,596,813 A | * | 1/1997 | Olson et al. | .................... 33/816 |
| 5,912,053 A | * | 6/1999 | Puiia et al. | ................... 427/309 |
| 6,033,159 A | * | 3/2000 | Kress et al. | .................... 408/83 |
| 6,254,319 B1 | * | 7/2001 | Maier et al. | .................... 408/57 |
| 6,565,296 B2 | * | 5/2003 | McKinley et al. | ........... 408/224 |
| 6,575,672 B1 | * | 6/2003 | Maier | ........................... 408/59 |
| 6,843,621 B2 | * | 1/2005 | Burnette | ..................... 408/227 |
| 6,913,428 B2 | * | 7/2005 | Kress et al. | ................. 408/144 |
| 6,953,036 B2 | * | 10/2005 | Ishii | ....................... 125/23.02 |

FOREIGN PATENT DOCUMENTS

JP 2003011014 A * 1/2003
JP 2003-181720 7/2003

OTHER PUBLICATIONS

USPTO translation of JP 58-051925, translated Mar. 2008.*
JP Laid-open 51925, Apr. 8, 1983, Sumitomo Elec.

* cited by examiner

*Primary Examiner*—Daniel W Howell
(74) *Attorney, Agent, or Firm*—St. Onge Steward Johnston & Reens LLC

(57) ABSTRACT

A machine reamer has a plurality of slender blades erected on the outer peripheral part of a reamer head body. Each blade of a pair of blades facing each other in a radial direction are different in material kind from each other. One of the blades treated as a pair is made of super-hard alloy and the other blade is made of one kind of material selected from the group of sintered ceramic, cermet, and microcrystalline diamond sintered material.

6 Claims, 1 Drawing Sheet

MACHINE REAMER

RELATED APPLICATIONS

This is a continuation of PCT/JP2006/313310, having an international filing date of Jul. 4, 2006, which claims priority from Japanese Application No. JP 2005-214243, filed Jul. 25, 2005.

TECHNICAL FIELD

The present invention relates to a machine reamer used to perform a reaming operation after having made holes with a drill.

BACKGROUND ART

In general, to adjust the size of a hole of a work material that has been pre-bored with a drill or to smooth the inner peripheral surface of the hole, a reaming operation is performed such that the inner periphery of the hole is cut with a shallow cutting allowance by use of a reamer that is a cutting tool and that has a plurality of slender blades (in most cases, six or eight blades) protruded from the periphery of its head. In recent years, a machine reamer in which blades made of a hard tool material, such as super-hard alloy, ceramic, or cermet, are fixed to, for example, a steel-made reamer head body in accordance with the kind of a work material or machining conditions has been widely used as a machine reamer (chucking reamer) to be attached to a main rotational shaft of a machine tool, instead of a machine reamer in which the whole of the tool or the whole of its head is made of a single tool material, such as high-speed steel. Especially, a machine reamer having blades made of super-hard alloy or cermet has been most widely used.

Recently, the whole of cutting operations has been required to have high accuracy and high efficiency, and a reaming operation has been likewise required to be heightened in processing efficiency. However, a conventional machine reamer has advantages and disadvantages resulting from the material of blades of the machine reamer, and hence the requirements have not been fully satisfied. For example, a machine reamer having blades made of super-hard alloy can be used for heavy cutting since the cutting edge of the blade has high toughness. However, since an increase in peripheral velocity allows a work material to be easily melted and adhered to the blade, it becomes difficult to perform a high-speed reaming operation. Additionally, the cutting edge of the blade is relatively quickly worn down, and its life is shortened. On the other hand, a machine reamer having ceramic blades is great in the hardness of the cutting edge of the blade, and hence the peripheral velocity can be heightened. However, since the cutting edge is brittle and is liable to be easily broken, it is difficult to use the ceramic blade for heavy cutting. Additionally, a machine reamer having cermet-made blades is merely intermediate between super-hard alloy and ceramic in performance, such as processing speed, durability, or cutting load resistance, because cermet exhibits intermediate properties between the properties of super-hard alloy and the properties of ceramic in toughness and hardness.

DISCLOSURE OF INVENTION

In consideration of these circumstances, the present invention has been made, and it is an object of the present invention to provide a machine reamer capable of obtaining high processing efficiency by preventing a work material from being easily melted and adhered to blades of the machine reamer even if cutting speed is increased and capable of obtaining excellent durability and a long machine life by lessening the abrasion of the cutting edge of the blade even if heavy cutting is performed.

To achieve the object, the machine reamer according to Claim 1 of the present invention has a plurality of slender blades (5A to 5F) erected on an outer peripheral part of a reamer head body (11), and materials of which the blades are made are plural in material kind. (For convenience of explanation, reference numerals shown in the drawings are given to the elements here.)

The machine reamer according to Claim 2 of the present invention is characterized by the machine reamer according to Claim 1, the blades (5A to 5F) are made of at least two kinds of materials selected from the group of super-hard alloy, sintered ceramic, cermet, and microcrystalline diamond sintered material.

The machine reamer according to Claim 3 of the present invention is characterized by the machine reamer according to Claim 1 or Claim 2, the blades (5A to 5F) are made of a plurality of kinds of materials differing from the material of the reamer head body made of steel, and are fixed to the outer peripheral part of the reamer head body (head 11).

The machine reamer according to Claim 4 of the present invention is characterized by the machine reamer according to any one of Claims 1 to Claim 3, the blades (5A to 5F) are even in number equal to or greater than four, and are erected on the outer peripheral part of the reamer head body (11) so as to be equally spaced out thereon, and the blades being treated as a pair and facing each other in a radial direction are different in material kind from each other.

The machine reamer according to Claim 5 of the present invention is characterized by the machine reamer according to Claim 4, one (5A, or 5C, or 5E) of the blades treated as a pair is made of super-hard alloy, and the other blade (5B, or 5D, or 5F) is made of one kind of material selected from the group of sintered ceramic, cermet, and microcrystalline diamond sintered material.

The machine reamer according to Claim 6 of the present invention is characterized by the machine reamer according to Claim 4, one (5A, or 5C, or 5E) of the blades treated as a pair is made of cermet, and the other blade (5B, or 5D, or 5F) is made of one kind of material selected from the group of sintered ceramic and microcrystalline diamond sintered material.

EFFECT OF THE INVENTION

In the machine reamer according to Claim 1 of the present invention, the blades erected on the outer peripheral part of the reamer head body are not made of the same material, and there are differences in physical properties, such as hardness or toughness, resulting from material differences between the blades. Therefore, the blades made of different materials can mutually counterbalance their disadvantages with each other, and can further develop their advantages by the synergistic effect, and hence both machining performance and durability of the whole of the machine reamer can be improved.

According to Claim 2 of the present invention, the blades of the machine reamer are made of at least two kinds of materials selected from the specific tool materials. Therefore, it is possible to fulfill the complementing capability to counterbalance the disadvantages of the blades made of mutually different materials by the mutually complementary relationship and the developing capability to increase their advantages. Thus, both machining performance and durability of the whole of the machine reamer can be improved.

According to Claim 3 of the present invention, the blades are made of a plurality of kinds of materials differing from the material of the reamer head body, which is made of steel, and are fixed to the outer peripheral part of the reamer head body by brazing or metalizing, and hence the machine reamer can be easily produced.

According to Claim 4 of the present invention, the blades treated as a pair and facing each other in the radial direction of the reamer head body are different in material kind from each other. Therefore, the material characteristics of the two blades deeply interact with one another during a reaming operation. As a result, the complementing capability to counterbalance the disadvantages of the blades by the mutually complementary relationship can be fulfilled more effectively, and both machining performance and durability of the whole of the machine reamer can be improved.

According to Claim 5 of the present invention, one of the blades treated as a pair facing each other in the radial direction of the reamer head body is made of super-hard alloy which is inferior in hardness and in abrasion resistance although this is superior in toughness and in fragility resistance, whereas the other blade is made of a material which is inferior in toughness and in fragility resistance although this material is superior in hardness and in abrasion resistance. Therefore, the reamer head having these blades can obtain greatly higher processing efficiency than a reamer head having blades each of which is made of the same material, and both the abrasion resistance and the fragility resistance of the cutting edge are improved, thus the life of the cutting edge are greatly lengthened.

According to Claim 6 of the present invention, one of the blades treated as a pair facing each other in the radial direction of the reamer head body is made of cermet which is slightly inferior in hardness and in abrasion resistance although this has relatively high toughness and excellent fragility resistance, whereas the other blade is made of a material which is inferior in toughness and in fragility resistance although this material is superior in hardness and in abrasion resistance. Therefore, the reamer head having these blades can obtain greatly higher processing efficiency than a reamer head having blades each of which is made of the same material, and both the abrasion resistance and the fragility resistance of the cutting edge are improved, thus the life of the cutting edge are greatly lengthened.

DESCRIPTION OF THE SYMBOLS

1 Main body
11 Head (reamer head body)
12 Taper shank
2 Coolant supply hole
4 Concave groove
5A to 5F Blade

BEST MODE FOR CARRYING OUT THE INVENTION

An embodiment of a machine reamer according to the present invention will be hereinafter described in detail with reference to the accompanying drawings.

Figure 1:
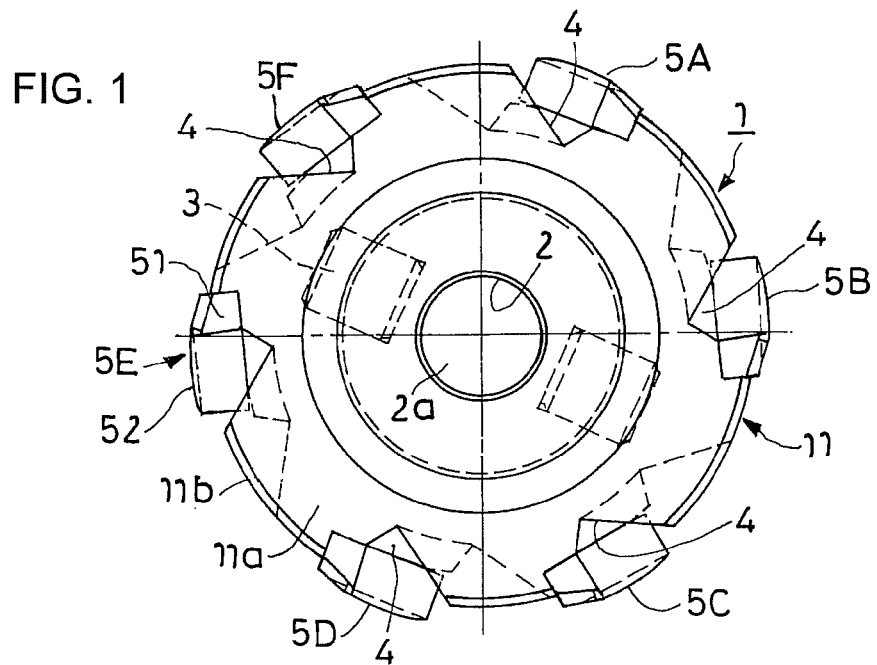
FIG. 1 is a front view of a machine reamer according to an embodiment of the present invention.
Figure 2:
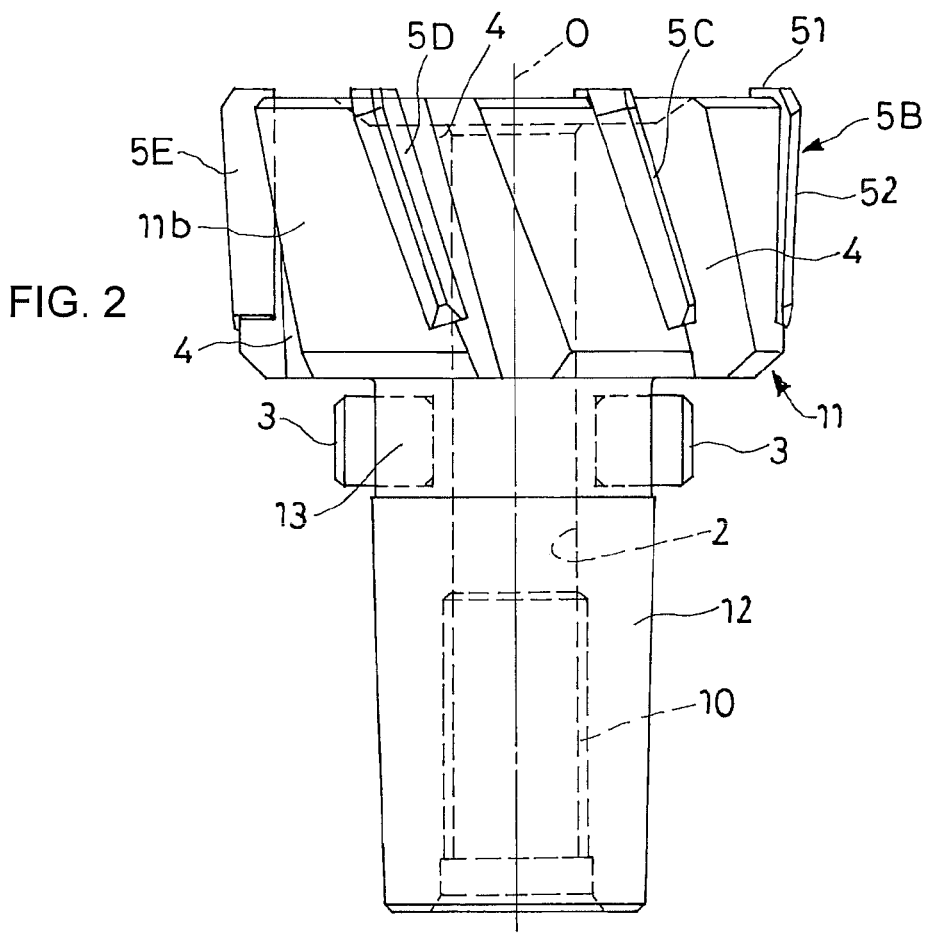
FIG. 2 is a side view of the machine reamer.

The machine reamer shown in FIG. 1 and FIG. 2 consists chiefly of a head 11 and a taper shank 12. The head 11 having a greater diameter occupies one side of a reamer main body 1 made of steel. The taper shank 12 that is fitted to the main rotational shaft of a machine tool (not shown) occupies the other side of the main body 1. A coolant supply hole 2 formed along an axial center O is bored at the center of a top surface 11a of the head 11 so as to serve as a coolant outlet 2a. A female screw 10 is formed on the inner circumferential surface of the coolant supply hole 2 at an end on the base side. Drive pins 3 and 3 that transmit the rotational driving force of the rotational shaft are respectively erected on both sides in the radial direction of a neck 13 occupying the middle of the main body 1.

Six concave grooves 4 are formed in the outer peripheral surface 11b of the head 11 of the main body 1. The six concave grooves 4 inclined with respect to the axial center O are equally spaced out in the circumferential direction. Slender blades 5A to 5F each of which is an independent member shaped like a substantially angular shaft are fixed to the outer peripheral surface 11b so as to face one side surface of each of the concave grooves 4. The blades 5A to 5F are arranged with phase differences of 60 degrees around the head 11. An end part 51 of each blade is slightly protruded from the top surface 11a of the head 11. Likewise, an outer surface part 52 of each blade is slightly protruded from the outer peripheral surface 11b of the head 11.

Herein, all of the six blades 5A to 5F are not made of the same material, and are made of at least two different kinds of materials. Preferably, as the materials, use is made of super-hard alloy composed chiefly of tungsten carbide such as a WC—Co-based material, sintered ceramic such as an alumina-based material, a silicon nitride-based material, or a boron nitride-based material, cermet such as a TiC/N-based material, and a microcrystalline diamond sintered body.

More preferably, among the six blades 5A to 5F, one of each pair facing each other in the radial direction of the head 11 is formed to differ in material from the other one. In other words, preferably, one of the blades 5A and 5D treated as a pair is formed to differ in material from the other one of the blades 5A and 5D. Likewise, one of the blades 5B and 5E treated as a pair is formed to differ in material from the other one of the blades 5B and 5E, and one of the blades 5C and 5F treated as a pair is formed to differ in material from the other one of the blades 5C and 5F.

Most preferably, one of the blades treated as a pair is made of super-hard alloy or cermet. More specifically, for example, each of the blades 5A, 5C, and 5E, which are disposed with intervals where the blades 5B, 5D, and 5F are respectively disposed in the circumferential direction, is made of super-hard alloy, and each of the other blades 5B, 5D, and 5F is made of sintered ceramic, or cermet, or microcrystalline diamond sintered material. Alternatively, each of the blades 5A, 5C, and 5E is made of cermet, and each of the other blades 5B, 5D, and 5F is made of sintered ceramic or microcrystalline diamond sintered material.

Although a blade made of cermet or super-hard alloy can be brazed to the head 11 of the main body 1 made of steel, a blade made of sintered ceramic has difficulty in brazing. However, the blade made of sintered ceramic can be reliably fixed to the head 11 if a metalizing method is applied. According to the metalizing method, a corresponding metallic member is brazed by metalizing a ceramic surface. The metalizing method is known as a technique for joining a metallic member to a ceramic member that cannot be brazed.

In general, a microcrystalline diamond sintered body is obtained in the form of a polycrystalline synthetic diamond layer in which a microcrystalline diamond is densely sintered onto a surface of a base member made of super-hard alloy according to an extra-high pressure and temperature technique. Therefore, in order to form a blade having the polycrystalline synthetic diamond layer, it is recommended to use a blade having a sintered layer made of microcrystalline diamond sintered material on the surface of a base member made of super-hard alloy and then fix this blade to the steel-made head 11 by brazing in the same way as a blade made of super-hard alloy.

According to the thus structured machine reamer, the blades 5A to 5F erected on the outer periphery of the head 11 are not the same in material, and are different from each other in physical properties, such as hardness or toughness. Therefore, the blades differing in material from each other are complemented with each other so as to overcome their disadvantages, and can develop their advantages by a synergistic effect. In particular, if the blades that are treated as a pair and that face each other in the radial direction of the head 11 are different in material from each other, the material characteristics of the two blades deeply interact with one another during a reaming operation. As a result, a complementing capability to overcome the disadvantages of the two blades and a developing capability to heighten the advantages thereof can be more effectively fulfilled, and hence the machine reamer is greatly improved both in machining performance and in durability as a whole.

Although differences in physical properties between the materials of the blades depend on the kinds of the materials to be used and compared, a rough tendency of exemplary tool materials can be shown as follows. For example, concerning hardness and abrasion resistance, the materials are graded from high to low in the following order, i.e., microcrystalline diamond sintered material, cubic boron nitride sintered material, alumina-based sintered ceramic, silicon nitride-based sintered ceramic, TiC/N-based cermet, and super-hard alloy. On the other hand, concerning toughness and fragility resistance, the materials are graded from high to low in the following order, i.e., super-hard alloy, TiC/N-based cermet, silicon nitride-based sintered ceramic, alumina-based sintered ceramic, microcrystalline diamond sintered material, and cubic boron nitride sintered material. Thus, the order concerning toughness and fragility resistance is substantially the reverse of the order concerning hardness and abrasion resistance. Concerning the thermally adhesive properties of a work material to be cut, cermet and sintered ceramic are generally low, whereas super-hard alloy is high.

Preferably, from a characteristic comparison between the exemplary tool materials, the materials of the blades that are treated as a pair and that face each other in the radial direction of the head 11 are used as a combination so that a characteristic difference between the blades becomes great, in order to effectively fulfill the complementing capability to complement the blades with each other. If superiority in material cost is added to the viewpoint of this characteristic difference, it is recommended to employ a combination in which super-hard alloy that exhibits an extreme both in hardness and abrasion resistance and in toughness and fragility resistance is used as the material of one of the two blades treated as a pair when a selection is made from the tool materials mentioned above, because both processing speed and the durability of the cutting edge can be remarkably improved. In this case, the material of the other blade may be any one of microcrystalline diamond sintered material, sintered ceramic, and cermet. In particular, from characteristic differences and material cost, sintered ceramic is optimum. The term "super-hard alloy" mentioned here includes coating super-hard alloy having relatively high hardness and ultrafine-particle super-hard alloy having high toughness.

Further, concerning the materials of the blades that are treated as a pair and that face each other in the radial direction of the head 11, it is recommended to employ a combination in which cermet is used as the material of one of the two blades, and sintered ceramic or microcrystalline diamond sintered material is used as the material of the other blade. It has been known that this combination makes it possible to more greatly increase processing speed and to more greatly lengthen the life of the cutting edge of the blade than in a conventional machine reamer that uses cermet as the material of its blade, as shown in a comparison between an embodiment and a comparative example described later.

Although the machine reamer shown in FIG. 1 and FIG. 2 has the six blades, the present invention includes all machine reamers each of which has at least two blades. Preferably, in order to keep balance as a machine reamer and to secure the operational effect mentioned above, an even number of blades, i.e., four or more blades are erected and are equally spaced out in the circumferential direction, and a pair of blades facing each other in the radial direction of the head differs in material from each other. Additionally, although the machine reamer mentioned above has the blades inclined with respect to the axial center, another type of machine reamer in which the longitudinal direction of each blade is parallel to the axial center is also included in the present invention.

Embodiment

In the form and the dimensional ratio shown in FIG. 1 and FIG. 2, machine reamers M1 to M7 each of which has six blades 5A to 5F made of materials, respectively, shown in Table 1 presented below were used. Each of the blades 5A to 5F has a tool cutting diameter of 20.0 mm and a length in the axial direction of 13.5 mm. Under the conditions mentioned in the table, a reaming operation was applied to a pilot hole that is 19.5 mm in diameter and that has been pre-bored in a work material of S50C while supplying an oily coolant under a pressure of 5 kg/cm$^2$, so as to examine the cutting speed, the roughness of an inner peripheral surface of the hole, and the heat adhesion degree of the work material. The results are shown in Table 1. The tool materials used for the blades are composed and abbreviated as follows.

Super-hard alloy: WC-based super-hard alloy (ISO-P20)

Ceramic: alumina-based sintered ceramic (85% $Al_2O_3$, 3.5% TiC, 10% $ZrO_3$)

Cermet: TiC/N-based cermet [89% (Ti,W)(C,N), 0.6% (Ti, Mo,W)C, 10.4% Ni/Co]

DIA: Microcrystalline diamond sintered material (diamond content of 88% by volume, particle diameter of 4.5 μm, hardness of Hv9000, deflective strength of 1.8 GPa)

As is apparent from Table 1, the conventional machine reamer M4 has six blades 5A to 5F all of which are made of super-hard alloy, whereas each of the machine reamers M1 to M3 of the present invention has six blades 5A to 5F structured such that the blade made of super-hard alloy and the blade made of another hard tool material (i.e., sintered ceramic, cermet, or microcrystalline diamond sintered material) are alternately arranged. The machine reamers M1 to M3 of the present invention can obtain a processing speed (table feed speed F) of about six to ten times that of the conventional machine reamer M4, and can obtain the lifetime of the cutting edge of about 2.7 to 3.3 times that of the conventional machine reamer M4. Likewise, the conventional machine reamer M7 has blades 5A to 5F all of which are made of cermet, whereas each of the machine reamers M5 and M6 of the present invention has six blades 5A to 5F structured such that the blade made of cermet and the blade made of sintered ceramic or microcrystalline diamond sintered material are alternately arranged. The machine reamers M5 and M6 of the present invention can obtain a processing speed of about 5.3 to 6.4 times that of the conventional machine reamer M7, and can obtain the lifetime of the cutting edge of about 1.3 to 1.5 times that of the conventional machine reamer M7. From these results, it is understood that disadvantages of one of the blades are counterbalanced by making a material combination in which a hard tool material is used for one of the blades of the machine reamer whereas another kind of hard tool material is used for another blade, and, as a result, a synergistic effect by which advantageous characteristics are remarkably improved can be brought about.

TABLE 1

|  |  | Machine reamer | | | | | | |
|---|---|---|---|---|---|---|---|---|
|  |  | M1 | M2 | M3 | M4 | M5 | M6 | M7 |
| Blade material | 5A | Super-hard alloy | Super-hard alloy | Super-hard alloy | Super-hard alloy | Cermet | Cermet | Cermet |
|  | 5B | Ceramic | Cermet | DIA | Super-hard alloy | Ceramic | DIA | Cermet |
|  | 5C | Super-hard alloy | Super-hard alloy | Super-hard alloy | Super-hard alloy | Cermet | Cermet | Cermet |
|  | 5D | Ceramic | Cermet | DIA | Super-hard alloy | Ceramic | DIA | Cermet |
|  | 5E | Super-hard alloy | Super-hard alloy | Super-hard alloy | Super-hard alloy | Cermet | Cermet | Cermet |
|  | 5F | Ceramic | Cermet | DIA | Super-hard alloy | Ceramic | DIA | Cermet |
| Cutting speed V (m/minute) | | 640 | 480 | 800 | 80 | 800 | 960 | 150 |
| Number of revolutions N (rpm) | | 10191 | 7643 | 12739 | 1274 | 12739 | 15287 | 2389 |
| Feed per revolution fn (mm/revolution) | | 0.5 | 0.5 | 0.5 | 0.5 | 0.5 | 0.5 | 0.5 |
| Table feed speed F (mm/minute) | | 5096 | 3822 | 6369 | 637 | 6369 | 7643 | 1194 |
| Cutting edge lifetime (times of machining) | | 1440 | 1080 | 1800 | 540 | 1800 | 2160 | 1440 |
| Roughness of inner peripheral surface of hole Rz (μm) | | 2.3 | 2.4 | 2.1 | 2.5 | 2.1 | 2.0 | 2.3 |

The invention claimed is:

1. A machine reamer comprising blades being even in number equal to or greater than four and being erected on the outer peripheral part of the reamer head body so as to be equally spaced out thereon, wherein the blades being treated as a pair and facing each other in a radial direction are different in material kind from each other, and wherein one of the blades treated as a pair is made of super-hard alloy composed chiefly of tungsten carbide and the other blade is made of sintered ceramic.

2. A machine reamer comprising blades being even in number equal to or greater than four and being erected on the outer peripheral part of the reamer head body so as to be equally spaced out thereon, wherein the blades being treated as a pair and facing each other in a radial direction are different in material kind from each other, and wherein one of the blades treated as a pair is made of cermet and the other blade is made of one kind of material selected from the group of sintered ceramic and microcrystalline diamond sintered material.

3. The machine reamer of claim 1, wherein the blades are fixed to the outer peripheral part of the reamer head body made of steel by brazing.

4. The machine reamer of claim 2, wherein the blades are fixed to the outer peripheral part of the reamer head body made of steel by brazing.

5. The machine reamer of claim 3, wherein blades made of sintered ceramic are fixed by metalizing.

6. The machine reamer of claim 4, wherein the blades made of sintered ceramic are fixed by metalizing.

* * * * *